United States Patent Office 3,469,942
Patented Sept. 30, 1969

3,469,942
PRODUCTION OF IRON OXIDE FOR OXIDIC SINTERED SHAPED BODIES
Friedrich Henneberger, Bitterfeld, and Fritz Gebhardt, Sandersdorf, Germany, assignors, by mesne assignments, to VEB Chemiekombinat Bitterfeld, Bitterfeld, Germany
No Drawing. Filed Oct. 12, 1966, Ser. No. 586,039
Int. Cl. C01g 49/02; C04b 35/26; H01v 9/02
U.S. Cl. 23—200                                       3 Claims

ABSTRACT OF THE DISCLOSURE

A process for producing iron oxide of high tamped density and high reactivity for making oxidic sintered shaped bodies, which comprises the steps of preparing iron-II-carbonate in crystalline form by adding an iron-II-sulfate solution to a solution of ammonium bicarbonate-ammonium carbonate with predetermined ratio of the carbonates, washing the iron carbonate free of soluble salts, and directly thereafter oxidizing it with admission of air to iron-III-oxide at temperatures ranging from 550 to 650° C.

---

The present invention relates to the production of iron oxide for oxidic sintered stamped bodies. More particularly, the invention relates to the production of such iron oxide which has a constant high tamped density and high reactivity.

Iron oxide which will be suitable for the production of oxidic sintered shaped bodies, for instance, of ferrites, has to meet certain chemical and physical specifications. Basically, two important physical requirements are high reactivity and constant low shrinkage in the sintering process.

High reactivity is desirable because the reaction between the iron oxide and the added components should be as complete as possible in the sintering process at comparatively low temperature. According to known operating principles, this will be the case when an intimate mixing of the components occurs whereby said components should consist of individual particles of the smallest possible size.

Low shrinkage of an even value in the sintering process is desirable in order to guarantee shaped bodies which will conform to desired dimensions or, in other words, will limit mechanical after-shaping treatment to a minimum. Low shrinkage usually can be expected when the iron oxide consists of compact individual particles wherein the pores only form a small part of the volume, that is to say, the tamped density is high.

Processes are already known which provide for the production of iron oxides with very small grain size of the individual particles, for instance, below 1 $\mu$m. However, these particles have a comparatively low tamping density, that is to say, they exhibit comparatively high shrinkage in the sintering process.

According to known and industrially used methods, iron oxide of higher tamped density and lower sintering shrinkage can be obtained by heating such iron oxides to higher temperatures. This entails, however, a growth of the grains with ensuing formation of larger crystals, whereby the desirable high reactivity is decreased. Studies made with red iron-oxide pigments have shown that the specific surface of the specimens heated successively by 100° C. over a range up to 1200° C., will decrease by about 50% up to a temperature of 800° C.; however, at 900° C. there is an abrupt drop to <1% of the starting material.

High tamped density, i.e. low sintering shrinkage, and high reactivity of iron oxide are therefore contradictory requirements. Hence, for practical purposes it was necessary to resort to a compromise.

The following table shows a comparison of the different types of iron oxides used for making oxidic sintered bodies, as regards grain-size ranges, tamped densities and specific surfaces which may be considered to characterize the two first-mentioned data and are practically a measure for the reactivity.

| Type | | Grain size range, $\mu$m. | Tamped density, g./ml. | Specific surface, m.$^2$/g. |
|---|---|---|---|---|
| 1 | Thermal decomposition of iron-II-sulfate. | 0.5–5 | 0.8–1.5 | 3–10 |
| 2 | Direct precipitation of iron-III-oxide. | 0.5–2 | 0.9–1.25 | 3.6–9 |
| 3 | Direct precipitation of iron-oxide hydrate. | 0.5–2 | 0.3–0.7 | 7–12 |
| 4 | By dehydration of Type 3. | 0.5–1.5 | 0.5–0.8 | 10–20 |
| 5 | Direct precipitation of magnetite. | 0.6–0.8 | 0.6–1.0 | 5–6 |
| 6 | Calcining of Type 5 at higher temperature. | 0.6–0.8 | 0.6–1.0 | 4–5 |
| 7 | Calcining of Type 5 at lower temperature. | 0.6–0.8 | 0.6–1.0 | 5–6 |

A type of iron oxide which became known later and which is produced by precipitation of iron-II-salt solutions with ammonium bicarbonate or ammonium carbonate, or sodium carbonate in the presence of ammonium salts, leads to comparatively coarse crystallized iron-II-carbonate, consisting of crystal aggregates of about 10 $\mu$m. It is oxidized to iron-III-oxide at slightly elevated temperature in air, and has the same outer shape and grain size. The tamped density of said iron oxide is 0.5–0.6 g./ml.

By heating this iron-III-oxide to temperatures of 600–700° C., the tamped density will increase to 1.0–1.2 g./ml., the porous particles formed thereby of about 4–6 $\mu$m. having comparatively high sintering shrinkage. When the iron oxide is heated to about 800° C., the tamped density rises to 1.5 g./ml., and compact particles are formed of 3–4 $\mu$m. with low sintering shrinkage.

This indicates that with the just mentioned type of iron oxide the reaction product having a high sintering shrinkage and low tamped density is converted likewise into a substance of lower reactivity, though at the same time having low shrinkage and higher tamped density.

It is an object of the present invention to overcome the above-mentioned shortcomings of the known processes and to provide a process which permits obtaining an iron oxide combining high reactivity with low sintering shrinkage and high tamped density, respectively.

It is another object of the present invention to provide simple and inexpensive means for obtaining the iron oxide of high tamped density and high reactivity.

Other objects and advantages of the present invention will become apparent from the following detailed description.

It has now been found that it is possible to produce iron oxide with the desired properties explained above when iron-II-carbonate is first made by precipitation by means known per se, said iron-II-carbonate being comparatively coarsely crystalline. The so obtained product is washed free of the adhering soluble salts and immediately converted into iron-III-oxide by heating with admission of air to temperatures ranging from 550° C. to 650° C., preferably at 600° C. According to the invention, the oxidation is therefore performed at much higher temperatures than required by chemical necessity, since oxidation and $CO_2$ liberation actually start at <100° C. and proceed at high rate at a temperature of 200° C. Working at the higher temperatures results in iron oxide having primary particles of 0.2–0.3 $\mu$m. or aggregates of such particles, which are only slightly adherent to each other and disintegrate into primary particles under low pressure, for instance, when mixed with the additive components of oxidic sintered bodies. The iron oxide made in accordance with the invention has the following characteristics:

Range of grain size _____ μm __ 0.2–0.3
Tamped density _____ g./ml__ 1.5–2.1
Spec. surface _____ m.$^2$/g__ 31

These data show that the iron oxide made according to the invention has high reactivity, i.e. smallest particle size and low shrinkage upon sintering or, in other words, high tamped density.

It has further been found that iron oxide with constant high tamped density, that is to say, low sintering shrinkage, can be obtained when in the known precipitation of iron-II-carbonate a certain ratio of ammonium carbonate:ammonium bicarbonate is maintained.

The following table shows the change in the tamped density of iron-III-oxide obtained by oxidation carried out at 600° C. in accordance with the invention, by variation of the ratio ammonium carbonate:ammonium bicarbonate:

| Ammonium, percent | | Tamped density, g./ml. |
| --- | --- | --- |
| Bicarbonate | Carbonate | |
| 100 | | 1.7 –2.0 |
| 75 | 25 | 1.6 –2.1 |
| 50 | 50 | 1.65–2.0 |
| 35 | 65 | 1.5 –1.6 |
| 25 | 75 | 1.5 –1.6 |
| | 100 | 0.6 –0.8 |

It was found, contrary to expectation, that at a ratio of 35:65 to 25:75 of ammonium bicarbonate:ammonium carbonate, high tamped densities with only slight variations were obtained, that is to say, such iron oxides upon being worked up into shaped bodies do not only exhibit low sintering shrinkage, as desired, but the shrinkage has a constant value.

It should however be noted that the above-mentioned constant tamped densities can only be obtained when in the precipitation of the iron-II-carbonate the iron-II-salt solution is added slowly, i.e. in the course of several hours, to the bicarbonate-carbonate solution, with vigorous stirring, and that an elevated temperature should be maintained at constant level in the reaction solution; and that toward the end the crystal mash containing small amounts of the precipitant is after-stirred for a short time.

The precipitant solution with the favorable ratio ammonium carbonate:ammonium bicarbonate is preferably prepared by dissolving commercial ammonium bicarbonate and adding the required amount of ammonia water.

Thus, the ratio according to the invention results in some economic advantage, since for precipitating one mol $Fe_2O_3$, only 2.3 mols bicarbonate and 0.8 mol $NH_3$ are needed, that is to say, about 40% of the more expensive bicarbonate are replaced by cheap aqueous ammonia.

A further economic advantage is due to the fact that the precipitation is carried out in the alkaline range and the volume needed is comparatively small for an iron-oxide precipitation, namely about 15 m.$^3$/t. As a consequence thereof, relatively small and unprotected steel apparatus can be used.

Moreover, the iron-II-carbonate precipitates can be freed from adherent salts and water much more readily and effectively than other iron-oxide precipitates. Favorable conditions are thereby provided for carrying out the ensuing oxidation at about 600° C. in accordance with the invention.

In the following, the invention will be more fully described in specific examples, but it should be understood that these are given by way of illustration and not of limitation, and that many changes in the details can be made without departing from the spirit of the invention.

Example 1

3000 liters of an iron-II-sulfate solution containing 1260 kg. $FeSO_4·7H_2O$ are treated with a precipitant solution containing in 2400 liters 463 kg. ammonium bicarbonate and 300 liters aqueous ammonia (230 g. $NH_3$/l.). The weight ratio of ammonium carbonate:ammonium bicarbonate is 73:27. The treatment comprises adding of the precipitant solution at a temperature of 50° C. in the course of 2½ hours with vigorous stirring. The temperature of 50° C. ∓3° C. is maintained in the reaction solution by indirect heating. Subsequently, stirring is continued for ¼ hour and the precipitated iron-II-carbonate is allowed to settle in the course of 10 minutes. The supernatant mother liquor is drained and the mash of crystals washed repeatedly by decantation with water, before being added in small doses to a rotary multiple-compartment filter. The product taken from the filter is then introduced into a rotary kiln heated externally, where it is heated to about 600° C.

When maintained at that temperature in the kiln for about 20 minutes, while a current of air is passed through at the rate of 100 m.$^3$/hr., decomposition and oxidation will take place simultaneously.

100 kg. of iron oxide are discharged from the kiln per hour, in the form of a fine powder. The product has high reactivity and a tamped density of 1.6 g./ml.; it may be used without further mechanical processing for the production of oxidic shaped sintered bodies.

Example 2

3000 liters of an iron-II-sulfate solution containing 1260 kg. $FeSO_4·7H_2O$ are added in the course of 2 hours with a precipitant solution heated to a temperature of 45° C.; the solution contains in 2400 liters 491 kg. ammonium bicarbonate and 275 liters aqueous ammonia (weight ratio ammonium carbonate:ammonium bicarbonate=65:35); addition is performed with vigorous stirring and the temperature of 45° C. (±3° C.) maintained in the reaction solution by indirect heating. Subsequently, the mixture is heated for another ¼ of an hour, whereupon the precipitated iron-II-carbonate is allowed to settle for 10 minutes. The supernatant mother liquor is withdrawn and the crystal mash added in measured doses to a band filter where the removal of adherent mother liquor by suction, washing with water, and drying by suction of the precipitate is continuously carried out. The moist product as it leaves the filter is passed directly to a heat-resistant belt conveyor which is moved through a channel furnace, where the goods are heated in thin layer to 570° C. (±20° C.) with simultaneous passage of a current of air at the rate of 80 m.$^3$/100 kg. throughput, whereby complete decomposition and oxidation of the product is obtained in 15 minutes. The product leaving the furnace is α-iron oxide in fine-grained form having a primary particle size of 0.2–0.3/μm. and a tamped density of 1.5 g./ml. This iron oxide may be used without further mechanical processing for the production of oxidic sintered shaped bodies.

What we claim is:

1. A process for producing iron oxide of high tamped density and high reactivity for making oxidic sintered shaped bodies, comprising the steps of preparing iron-II-carbonate in crystalline form, by slowly adding iron-II-sulfate solution to a solution of ammonium bicarbonate-ammonium carbonate, the ratio of the carbonates being from 25% to 35% by weight of bicarbonate to 75% to 65% by weight of carbonate, washing said iron-II-carbonate to free it from adherent soluble salts, and directly thereafter oxidizing it with admission of air to iron-III-oxide at temperatures ranging from 550 to 650° C.

2. The process as defined in claim 1, wherein the temperature of the oxidizing treatment is 600° C.

3. The process as defined in claim 1, wherein the addition of the iron-II-sulfate solution to the ammonium bicarbonate-ammonium carbonate solution occurs in the course of 2 to 3 hours, with vigorous stirring while maintaining the temperature at a constant level of about 50° C., thus obtaining the iron-II-carbonate precipitated in crystalline form, and stirring the so obtained precipitate which still contains small amounts of the precipitant agent, for a short time, before washing it in preparation for the oxidation to iron-III-oxide.

References Cited

UNITED STATES PATENTS 842,452   1/1907   Flugge _____ 23—61

FOREIGN PATENTS 588,034   5/1947   Great Britain.
956,604   4/1964   Great Britain.

OSCAR R. VERTIZ, Primary Examiner

G. T. OZAKI, Assistant Examiner

U.S. Cl. X.R.

106—304; 252—62.56

PO-1050
(5/69)

UNITED STATES PATENT OFFICE
CERTIFICATE OF CORRECTION

Patent No. 3,469,942　　　　　　　　Dated September 13, 1969

Inventor(s) Friedrich Henneberger et al.

It is certified that error appears in the above-identified patent and that said Letters Patent are hereby corrected as shown below:

Column 3, line 56, change "2.3" to -- 2.4 --; and column 4, line 10, change "$\frac{-}{+}$" to -- $\pm$ --.

SIGNED AND
SEALED

DEC 23 1969

(SEAL)
Attest:

Edward M. Fletcher, Jr.
Attesting Officer

WILLIAM E. SCHUYLER, J
Commissioner of Patent